INVENTOR
EDWARD A. FOLEY.
GEORGE J. DETKO.
BY Harry A. Mitman
ATTORNEY

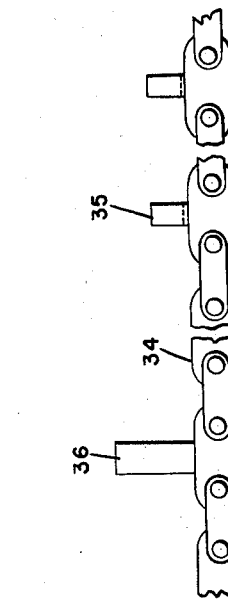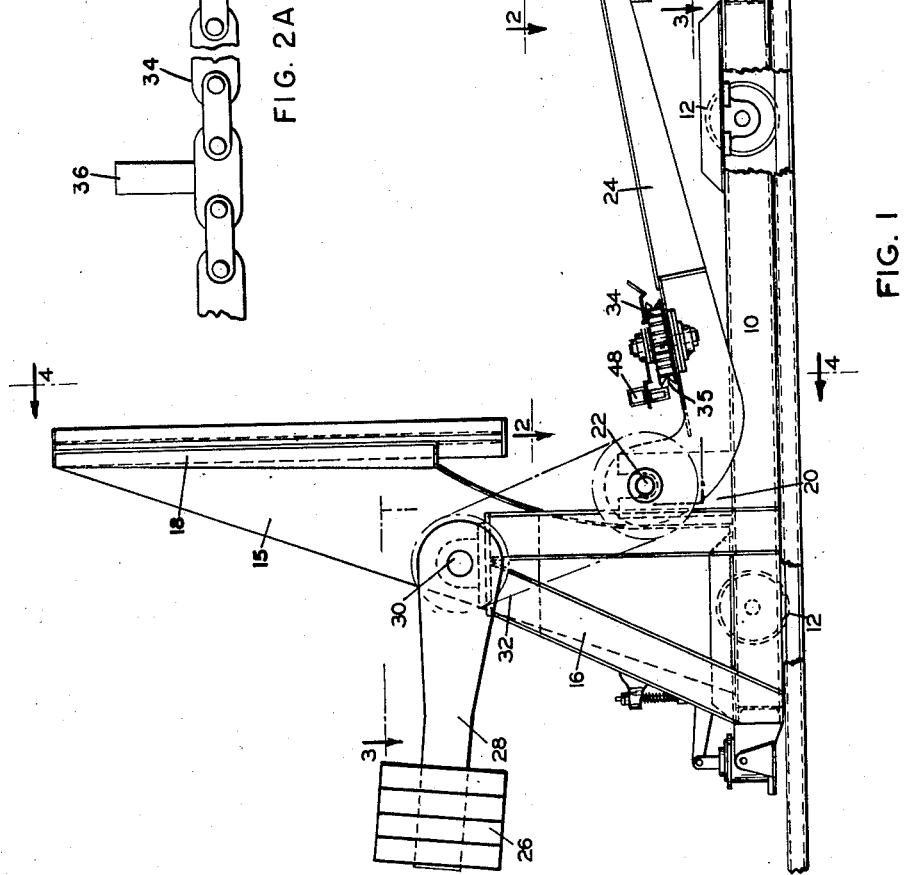

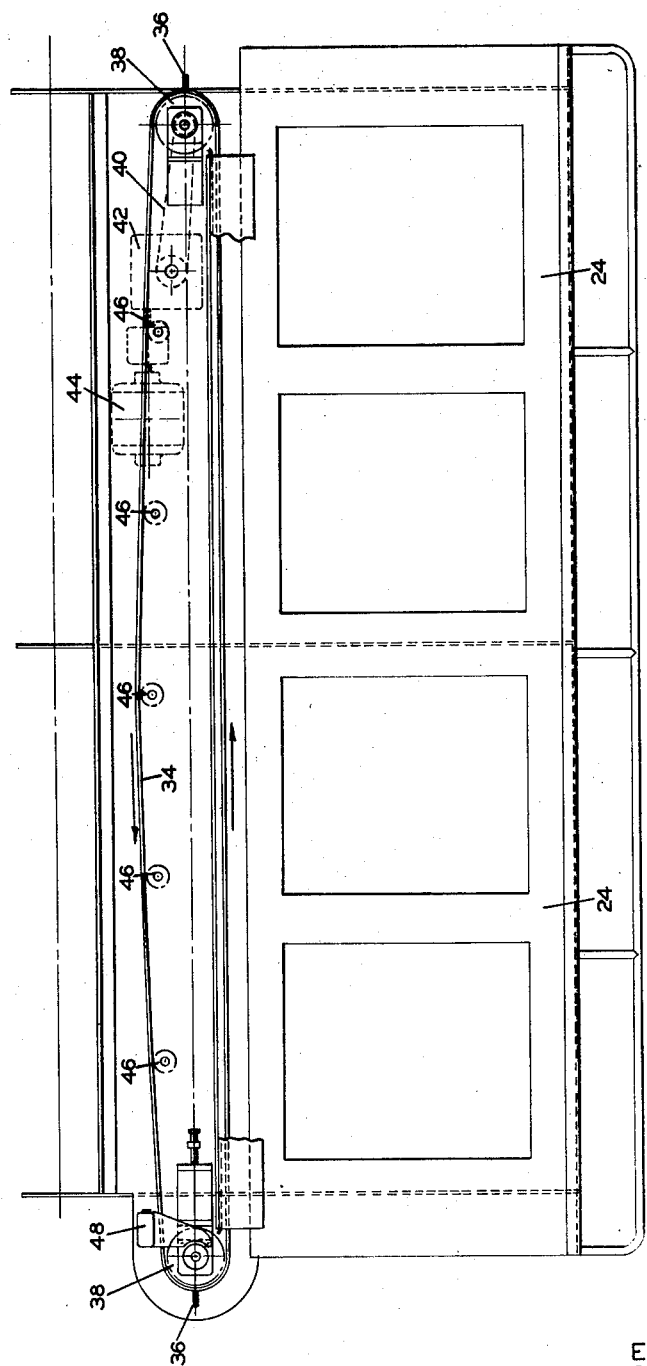

Dec. 9, 1958

E. A. FOLEY ET AL 2,863,571

SHEET HANDLING APPARATUS

Filed Oct. 2, 1953

INVENTOR
EDWARD A. FOLEY.
GEORGE J. DETKO.

BY
ATTORNEY

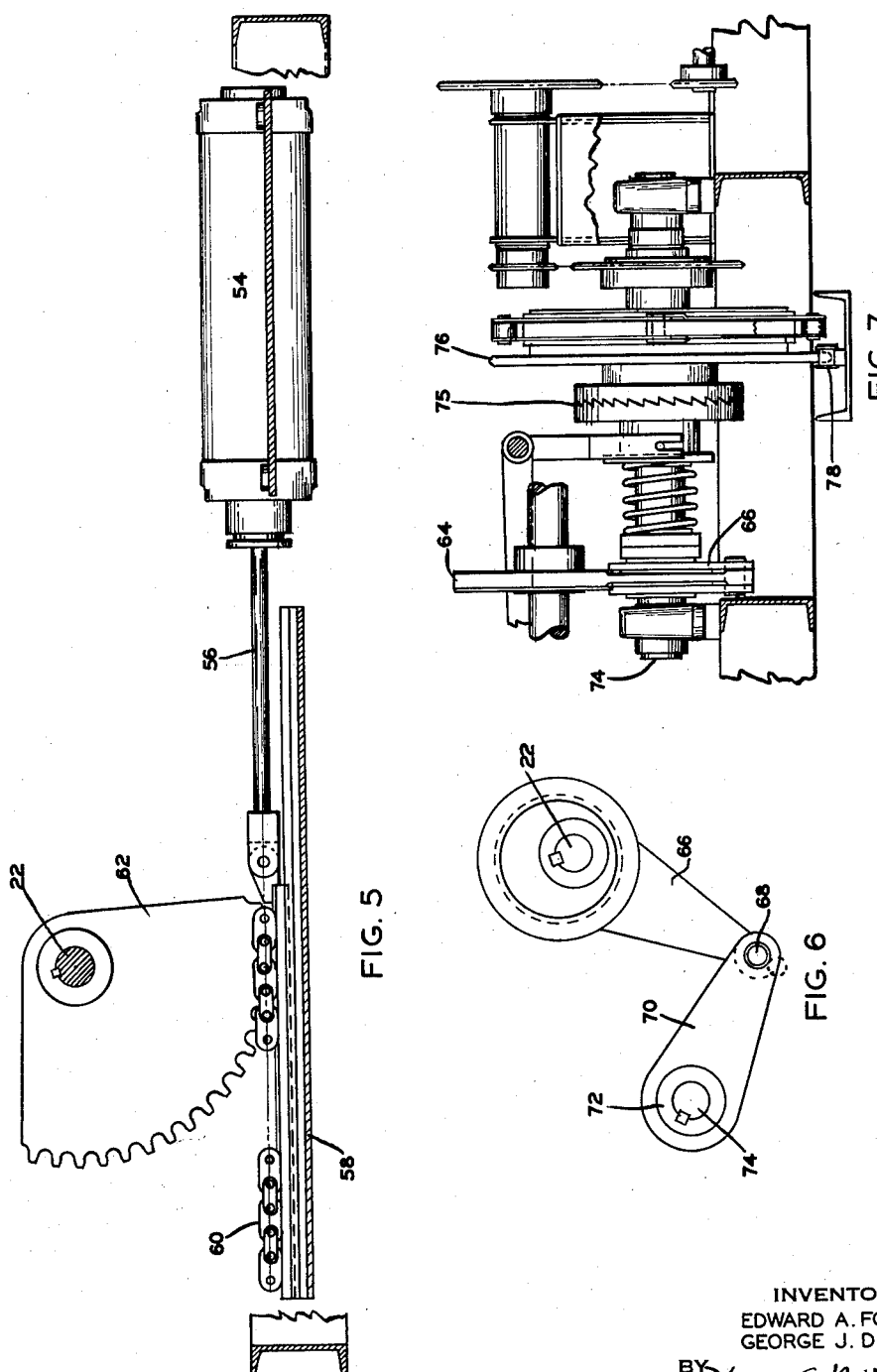

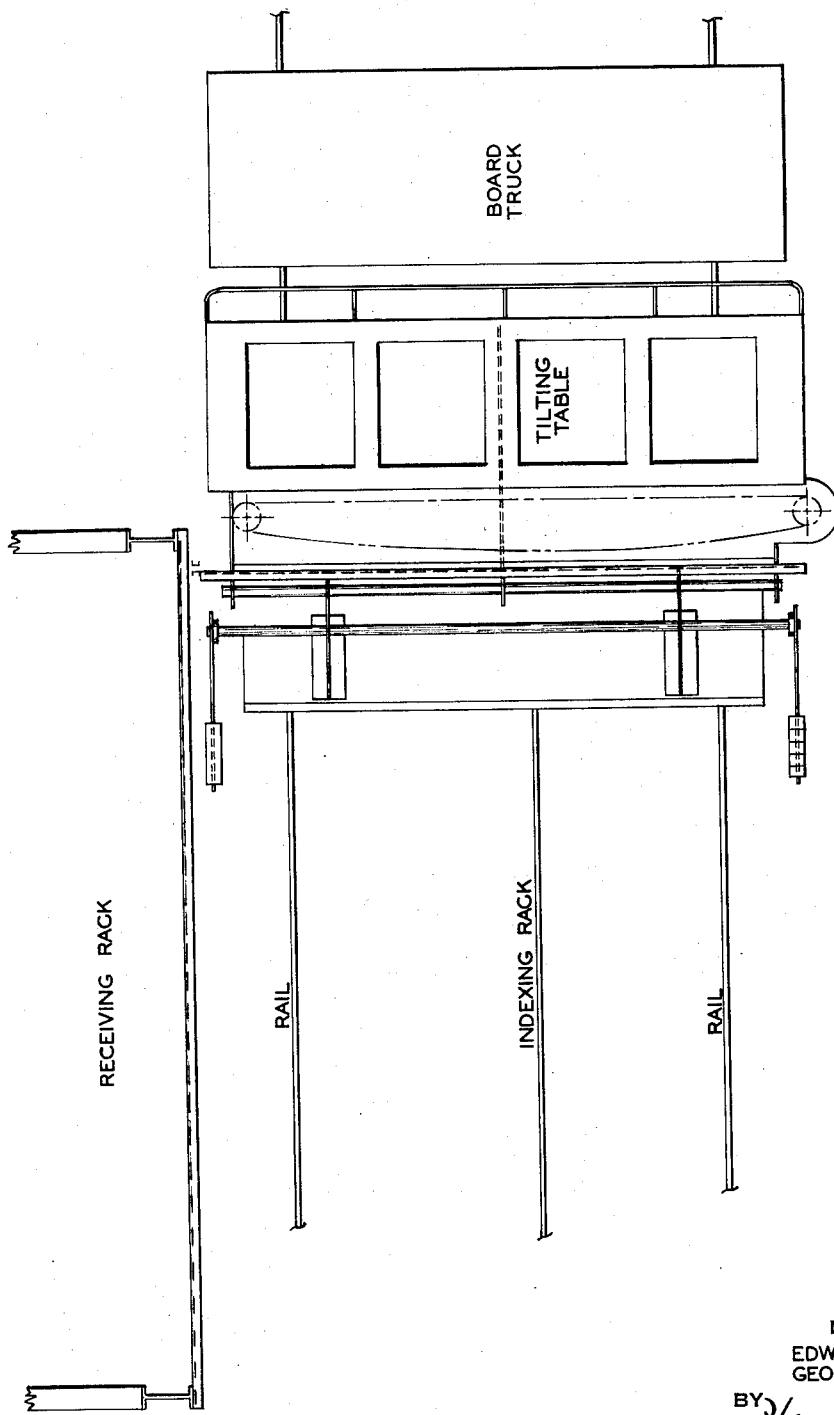

_United States Patent Office_

2,863,571
Patented Dec. 9, 1958

2,863,571

SHEET HANDLING APPARATUS

Edward A. Foley, Laurel, Miss., and George J. Detko, Huntsville, Ala., assignors to Masonite Corporation, Laurel, Miss., a corporation of Delaware Application October 2, 1953, Serial No. 383,735

7 Claims. (Cl. 214—1)

This invention relates to a novel sheet handling apparatus and relates more particularly to an apparatus for automatically handling relatively large, self-sustaining sheets such as hardboard products and the like articles. The novel apparatus is particularly adapted for transferring horizontally stacked sheets to a vertical and spaced-apart parallel relationship.

In the manufacture of hardboard products the finished, relatively large and dense sheets are often subjected to one or more conditioning treatments. For example, the sheets may be subjected to humidifying treatment wherein the moisture content thereof is carefully adjusted within relatively critical limits. The sheets may also be subjected to a so-called tempering treatment with drying oils, synthetic resins, and the like compositions. In all of these sheet conditioning operations, the articles have been heretofore manually handled. Ordinarily the sheets of a horizontal stack have been manually transferred to an upright position in which the individual sheets rest upon one of the sheet edges, usually in a receiving frame device in which the boards are spaced apart from one another by separating means. In each instance, however, the handling of the sheet products has been accomplished by trained crews and the efficiency of the operations has been completely dependent thereon.

The present invention is directed to the provision of a novel apparatus which automatically transfers the individual sheets of a horizontal stack to a vertical position and which thereafter discharges the individual sheets into a receiving frame having spaced slots or compartments. In operation, a sheet is manually fed into the apparatus, the sheet is then elevated to vertical position and discharged into the desired slot of the receiving frame. The apparatus automatically travels along the entire extent of the receiving frame, indexing itself and discharging into each of the compartments thereof a single sheet. Thus the novel apparatus of the invention greatly reduces the manual labor involved in handling the sheet articles. In addition, it accomplishes the operations much more quickly and efficiently than the heretofore employed methods. The apparatus will hereinafter be described with more particularity with reference to the accompanying drawings in which:

Figure 1 is a side elevation of the apparatus,

Figure 2 is a sectional top plan view through 2—2 of Figure 1,

Figure 3:
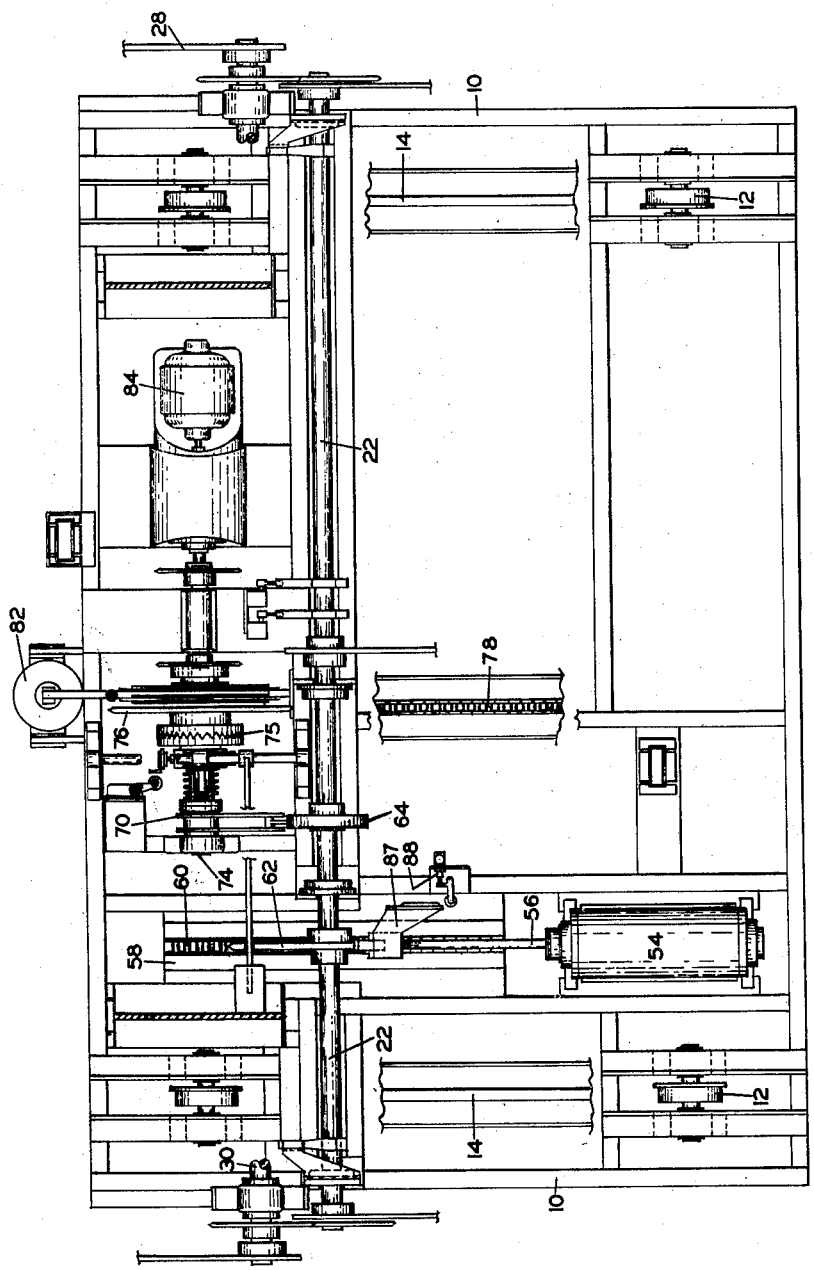
Figure 4:
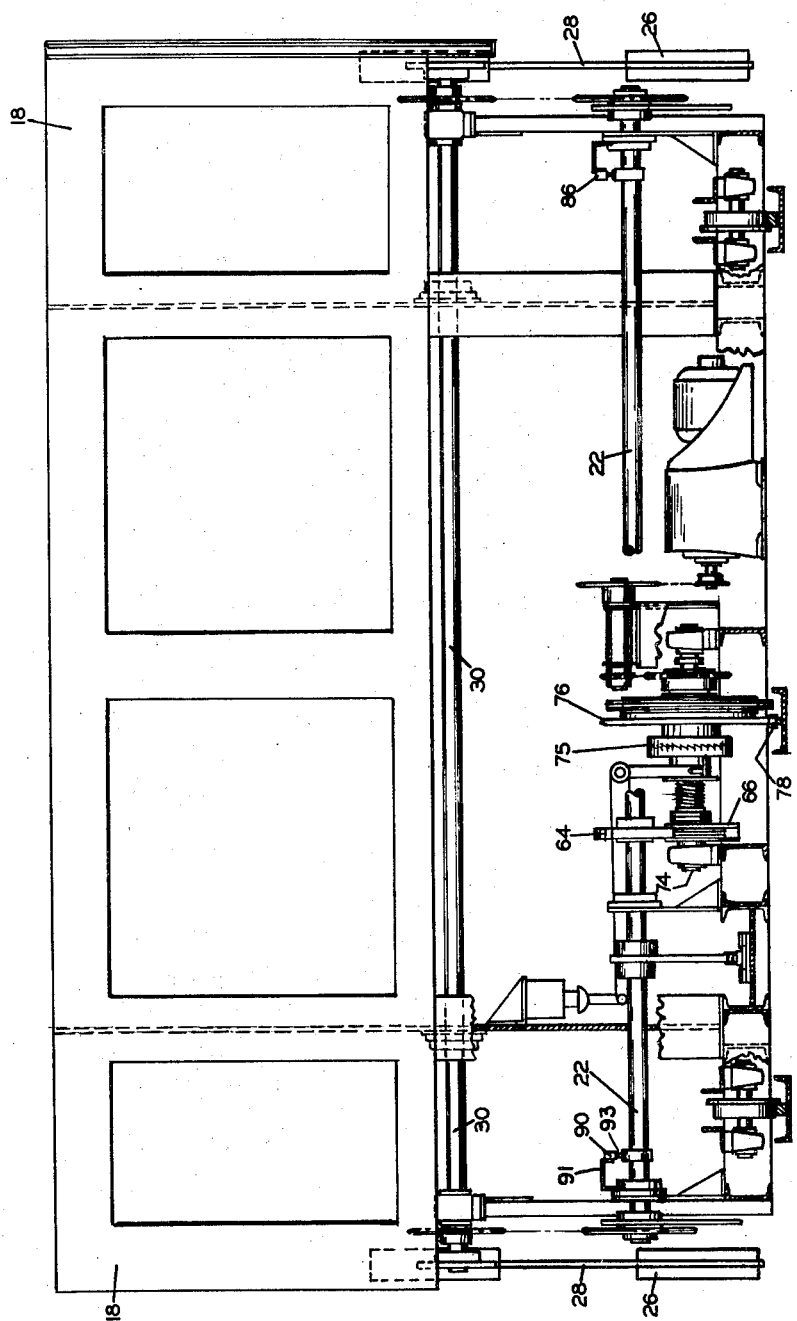

Figure 2A is an enlarged fragmentary side elevation of a conveyor chain equipped with lugs, Figure 3 is a sectional top plan view through 3—3 of Figure 1, Figure 4 is an end elevation through 4—4 of Figure 1, Figure 5 is a fragmentary side elevation of the fluid cylinder and rack arrangement which motivates the apparatus, Figure 6 is a fragmentary side elevation of an eccentric mechanism which indexes the movement of the apparatus, Figure 7 is an enlarged section of Figure 4 showing the clutch and indexing mechanism, and Figure 8 is a schematic illustration of the apparatus in use.

In the drawings, a supporting carriage frame 10 is mounted on the wheels 12 which are, in turn, borne by the parallel tracks 14. The upright frame members 15 supported on the carriage 10 serve to support the vertically positioned sheet guide 18. Vertical members 20, mounted on either side of the carriage 10, support the main drive shaft 22 which extends therebetween and to which is pivotally attached the table-like sheet supporting member 24. Sheet supporting member 24 is counterbalanced by weights 26 which are mounted on arms 28 and pivotally attached to the upright frame members 16 by means of shaft 30 extending therebetween. The counterbalancing mechanism cooperates with the sheet supporting member 24 through a sprocket and chain arrangement illustrated at 32 of Figure 1. A sheet-receiving and motivating chain belt 34 is attached to the sheet supporting member 24. Chain belt 34 is equipped with a plurality of V-shaped lugs 35 adapted to grip an edge of a sheet. The chain belt 34 also carries two cam lugs 36 so positioned thereon that they are 180° apart. The chain belt 34 travels on the sprockets 38 which are pivotally attached at either side of the sheet supporting member 24. The chain belt 34 is driven by means of a chain drive 40, reduction gears 42, and motor 44. Chain belt 34 is kept taut by the idler sprockets 46 and is actuated by the switch 48.

In operation, a hardboard sheet or the like article is placed on the sheet supporting member 24 so that one of its edges is in intimate contact with the small lugs 35 on the chain belt 34. Desirably, the hardboard sheets may be stacked on a truck 50 positioned on the carriage 52 which is attached to the main carriage 10 and is moved thereby. Subsequent to positioning of the sheet, the main shaft 22 is actuated and turns in a counterclockwise direction until the sheet supporting member 24 is in an upright position. At this point, sheet supporting member 24 is parallel to the sheet guide member 18 and spaced slightly apart therefrom so as to provide a channel through which the sheet may be travelled and ejected from the apparatus. Concurrently with the arrival of sheet supporting member 24 at its vertical position, which is approximately 80° removed from its near-horizontal position, the chain belt 34 is actuated and driven through one-half revolution thereby ejecting the sheet from the apparatus. As the chain belt 34 is driven through one-half of its length, the relative position of the cam lugs 36 is substantially reversed and, in passing, one of the lugs 36 trips the switch 48 which actuates a magnetic clutch-break mechanism thus arresting the motion of the chain belt 34 and, at the same time, reversing the direction of travel of the main shaft 22 which returns the sheet supporting member 24 to its original near-horizontal position. The apparatus is then in position to receive another hardboard sheet and to repeat the process of elevating the sheet to vertical position and to eject it from the apparatus.

An outstanding feature of the present invention resides in the cooperative means for moving the sheet supporting member 24 from horizontal to vertical position and return and in the means for concurrently indexing the apparatus at each sheet handling cycle in front of successive openings in the stationary receiving frame into which the individual sheets are injected. A fluid actuated cylinder 54 is mounted between the side elements of the carriage 10 and so positioned that its piston rod 56 exerts a horizontal thrust. The cylinder may be either hydraulic or pneumatic depending on the speed of operation desired. The extended piston rod 56 of cylinder 54 is in turn connected to a cross head type guide 58 upon the upper surface of which there is a rigidly disposed chain 60 which, in effect, forms a rack. The links of the chain 60 engagethe teeth of sprocket section 62 which, in turn, is mounted on the main shaft 22. As cylinder 54 is actuated, the piston rod 56 moves the cross head 58 and chain 60 and thus causes movement of the main shaft 22 by means of the sprocket 62. Thus, the counterclockwise movement of the sprocket 62 and main shaft 22 results in the elevation of sheet supporting member 24 to its vertical position while clockwise movement lowers the member 24 to its near-horizontal position.

Also mounted on the main shaft 22 is an eccentric collar 64 which, by means of the arm 66, pivotal connection 68, and arm 70, cooperates with the collar 72 mounted on an auxiliary shaft 74. As the main shaft 22 revolves in a clockwise direction, this motion is translated, by means of the eccentric collar 64, arms 66 and 70, and the collar 72 to the auxiliary shaft 74 in the form of counterclockwise rotation thereof. Ratchet-type clutch 75 is mounted around the auxiliary shaft 74 and is so constructed that the counterclockwise rotation of the shaft 74 causes a positive action of the ratchet, i. e. during the lowering of the sheet supporting member 24, the ratchet 75 exerts a thrust on the sprocket 76. The teeth of sprocket 76 engage a chain rack 78 positioned therebeneath and fixedly attached to the foundation over which the apparatus moves. Thus, the force exerted by the clutch 75 on sprocket 76 results in the movement of the apparatus along its track. During the raising of the sheet supporting member 24, the auxiliary shaft 74 is rotated in a clockwise direction. This rotation results in the disengagement of the ratchet 75 to the extent that it slips the precise distance of one cog. The aforementioned positive force exerted by the ratchet 75 extends through a similar distance and, it is this movement which regulates or indexes the apparatus in front of successive compartments in the stationary frame which receives the ejected hardboard sheets. A brake 82, automatically actuated by the upward movement of the sheet supporting member 24, insures that the apparatus carriage will be held motionless during the raising and ejection of a sheet. Thereafter, during the lowering of the sheet supporting member 24, the apparatus moves along the track 14 for a short distance and is automatically indexed in front of the next succeeding compartment in the stationary receiving frame. A separate and auxiliary source of power is provided by the motor 84 and serves to travel the apparatus backward and forward along the track 14 when it is necessary, as, for example, in replenishing the supply of hardboard sheets to the carriage 50. During such travel of the apparatus, the ratchet-type clutch 75 and brake 82 are maintained in disengaged position.

During the operation of the apparatus, as has hereinbefore been described, the main shaft 22 is first rotated in a counterclockwise direction. As the sheet supporting member 24 arrives at substantially its vertical position, switch 86 is tripped and the motor 44 is thereby actuated and thus imparts motion to the chain conveyor 34. During the ejection of a sheet from the apparatus by means of the movement of chain conveyor 34, the force exerted by the fluid actuated cylinder 54 is maintained so as to insure that the sheet supporting member 24 remains in its vertical position. As hereinbefore stated, the travel of one of the cam lugs 36 and its contact with the switch 48 causes the motion of the chain conveyor 34 to be arrested. Tripping of the switch 48 also energizes the valves which regulate the flow of fluid to the cylinder 54 and thereby causes the reverse actuation of the cylinder 54 and piston rod 56 whereby the main shaft 22 is caused to rotate in a clockwise direction. This rotation of shaft 22 lowers the sheet supporting member 24. However, when the piston rod 56 has travelled through approximately half of its thrust, a projection 87 thereon, in passing, presses upon the valve 88 and thereby causes the fluid to be bled from the cylinder 54. This bleeding of the fluid arrests the positive force exerted by the cylinder 54 and allows the downward motion of sheet supporting member 24 to be considerably slowed down by the opposing force exerted by the counterweights 26 which, at this time, are approaching the upper limit of their respective arcs of travel. Thus, sheet supporting member 24 arrives at its near horizontal position relatively slowly and comes to rest, momentarily, against the bumper 92 which is positioned thereunder. As the sheet supporting member 24 arrives at its lowermost position switch 90, which is mounted on the bracket 91, is tripped by the finger member 93 mounted on the main shaft 22. This energizes the valves controlling the flow of fluid to the cylinder 54 and the hereinbefore described cycle is reinstituted with the result that the sheet supporting member 24 immediately starts through its elevation to vertical position. In the interval of rest of the sheet supporting member 24, a hardboard sheet may be placed thereon and the elevation thereof to vertical position and ejection from the apparatus is effected. The thus described cycles continue until the desired number of hardboard sheets have been transferred from a horizontal stacked position to a vertical and spaced-apart relationship.

Although the foregoing description has been directed to the accompanying drawings and has recited the employment of several electrical microswitches which energize solenoids, obviously other means of accomplishing the same results may be employed. For example, a system of pneumatic or hydraulic valves may be employed to actuate the various cooperating elements of the novel apparatus of the invention. It is to be understood, therefore, that the invention is limited solely by the scope of the appended claims and modifications of the apparatus within the skill of the art are contemplated herein.

We claim:

1. Apparatus for handling self-supporting sheets and adapted to transfer said sheets from a horizontally stacked position to a spaced apart vertical and parallel relationship comprising the combination of a carriage mounted on track-borne wheels, vertical frame members mounted on said carriage, a vertically positioned sheet guide attached to the vertical frame members, a sheet-supporting member pivotally attached to a main shaft extending between upright supporting members mounted at the sides of said carriage, means for travelling said sheet-supporting member through approximately an 80° arc from a near horizontal position to a vertical position, said sheet-supporting member positioned so as to be slightly spaced apart from, and parallel to, said sheet guide when in its vertical position, a sprocket-driven chain conveyor mounted on said sheet-supporting member adjacent to the pivotal support thereof, said chain conveyor being in substantial alignment with, and immediately beneath, said vertical sheet guide when said sheet-supporting member is moved into its vertical position, lugs mounted on said conveyor and adapted to engage the supporting edge of a sheet in vertical position, means to drive said conveyor to move the sheet in a direction transverse to the direction of travel of the apparatus, and means for travelling said carriage intermittently for predetermined fixed distances.

2. An apparatus as in claim 1, and including counterweight elements at both sides of the apparatus, pivotally attached to the vertical frame members and cooperatively connected to said sheet-supporting member.

3. An apparatus as in claim 2, and wherein the means for travelling said sheet-supporting member comprises a fluid actuated cylinder, the piston shaft of which is attached to a rack, said rack being engaged by a toothed gear which is in turn attached to said main shaft.

4. An apparatus as in claim 3, and wherein the chain conveyor actuating means is mounted in close proximity to said main shaft and positioned so as to be energized at the vertical position of said sheet-supporting member as said member contacts a switch whereby the chain conveyor is driven through half of a revolution.

5. An apparatus as in claim 4, and including at each extremity of said chain conveyor, and spaced apart by 180°, a cam lug of substantially greater length than said sheet-engaging lugs, said cam lug adapted to engage a switch and thereby terminate the revolution of said chain conveyor.

6. An apparatus as in claim 5, and including in combination therewtih a vertically-adjustable shock-absorbing element mounted on said carriage substantially directly beneath the leading edge of said sheet-supporting member.

7. An apparatus as in claim 6, and including in combination therewtih a drive shaft carrying a clutch-controlled toothed gear in engagement wtih a rack therebeneath, a clutch-actuating collar around said drive shaft and cooperatively connected to said main shaft by means of a jointed connecting arm attached to an eccentrically mounted collar on said main shaft, said clutch and said toothed gear being actuated by the rotation of said main shaft whereby said apparatus is moved and indexed before successive work stations.

References Cited in the file of this patent

UNITED STATES PATENTS

| | | |
|---|---|---|
| 692,746 | Wellman | Feb. 4, 1902 |
| 1,588,949 | Drake | June 15, 1926 |
| 2,146,617 | Bishop | Feb. 7, 1939 |
| 2,297,583 | Rowlands | Sept. 29, 1942 |
| 2,626,071 | Smith | Jan. 20, 1953 |